US012802165B2

(12) United States Patent
Yanagisawa

(10) Patent No.: US 12,802,165 B2
(45) Date of Patent: Nov. 17, 2026

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Keisuke Yanagisawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 19/013,467

(22) Filed: Jan. 8, 2025

(65) Prior Publication Data

US 2025/0238896 A1 Jul. 24, 2025

(30) Foreign Application Priority Data

Jan. 23, 2024 (JP) ................................ 2024-008220

(51) Int. Cl.
*G06T 3/4053* (2024.01)
*G06T 3/4015* (2024.01)
*G06T 7/246* (2017.01)

(52) U.S. Cl.
CPC .......... *G06T 3/4053* (2013.01); *G06T 3/4015* (2013.01); *G06T 7/248* (2017.01); *G06T 2207/10016* (2013.01); *G06T 2207/20212* (2013.01)

(58) Field of Classification Search
CPC ..... G06T 3/4053; G06T 3/4015; G06T 7/248; G06T 2207/10016; G06T 2207/20212; H04N 25/48
See application file for complete search history.

(56) References Cited

U.S. PATENT DOCUMENTS 8,315,474 B2 * 11/2012 Okada .................. G06T 3/4069 382/260
2020/0120271 A1 * 4/2020 Furukawa ........... H04N 23/951

FOREIGN PATENT DOCUMENTS

JP 2012226489 A 11/2012
WO WO-2019163234 A1 * 8/2019 ............ H04N 25/48

* cited by examiner

*Primary Examiner* — Timothy J Henn
(74) *Attorney, Agent, or Firm* — Cowan, Liebowitz & Latman, P.C.

(57) ABSTRACT

There is provided an image processing apparatus comprising. A first obtaining unit obtains two shot images shot at two respective shooting positions of an image sensor shifted in a first direction by a non-integer multiple of a pixel pitch of the image sensor. A first generating unit generates two enlarged images by enlarging the two shot images such that a pixel shift amount between the two enlarged images, which is derived from a shift between the two shooting positions, becomes an integer number of pixels. A second obtaining unit obtains a difference between the two enlarged images that have been aligned on a basis of the pixel shift amount between the two enlarged images.

10 Claims, 5 Drawing Sheets

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

A technique is known in which, in a digital camera in which the position of the image sensor can be changed, an image having a resolution exceeding the number of pixels of the image sensor can be generated by compositing a plurality of images shot at shooting positions shifted from each other by distances smaller than the pitch of the pixels (see Japanese Patent Laid-Open No. 2012-226489).

If an object that moves (a moving object) is present among the plurality of images to be composited, a region will arise in the composite image in which a component derived from an image in which the moving object is present and a component derived from an image in which the moving object is not present are mixed (a moving object region), resulting in an unnatural composite image.

In processing for compositing a plurality of images, obtaining a difference between images is generally known as a way to detect a moving object region. To accurately detect the moving object region, it is necessary to obtain the difference between images with a high level of accuracy. However, if the shift in the shooting positions between the images is a non-integer multiple of the pixel pitch (a multiple lower than 1, when smaller than the pixel pitch, and a non-integer multiple greater than 1, when larger than the pixel pitch), a shift smaller than the pixel pitch will remain between the images even if the pixel positions of the images are moved. This makes it difficult to obtain the difference between images with a high level of accuracy.

SUMMARY OF THE INVENTION

Having been achieved in light of the foregoing circumstances, the present invention provides a technique for obtaining information that accurately expresses a difference between images shot at shooting positions shifted by an amount equivalent to a non-integer multiple of the pixel pitch of an image sensor.

According to a first aspect of the present invention, there is provided an image processing apparatus comprising at least one processor and/or at least one circuit which functions as: a first obtaining unit configured to obtain two shot images shot at two respective shooting positions of an image sensor shifted in a first direction by a non-integer multiple of a pixel pitch of the image sensor; a first generating unit configured to generate two enlarged images by enlarging the two shot images such that a pixel shift amount between the two enlarged images, which is derived from a shift between the two shooting positions, becomes an integer number of pixels; and a second obtaining unit configured to obtain a difference between the two enlarged images that have been aligned on a basis of the pixel shift amount between the two enlarged images.

According to a second aspect of the present invention, there is provided an image capturing apparatus comprising: an image sensor; and at least one processor and/or at least one circuit which functions as: a first obtaining unit configured to obtain two shot images shot at two respective shooting positions of the image sensor shifted in a first direction by a non-integer multiple of a pixel pitch of the image sensor; a first generating unit configured to generate two enlarged images by enlarging the two shot images such that a pixel shift amount between the two enlarged images, which is derived from a shift between the two shooting positions, becomes an integer number of pixels; and a second obtaining unit configured to obtain a difference between the two enlarged images that have been aligned on a basis of the pixel shift amount between the two enlarged images.

According to a third aspect of the present invention, there is provided an image processing method executed by an image processing apparatus, comprising: obtaining two shot images shot at two respective shooting positions of an image sensor shifted in a first direction by a non-integer multiple of a pixel pitch of the image sensor; generating two enlarged images by enlarging the two shot images such that a pixel shift amount between the two enlarged images, which is derived from a shift between the two shooting positions, becomes an integer number of pixels; and obtaining a difference between the two enlarged images that have been aligned on a basis of the pixel shift amount between the two enlarged images.

According to a fourth aspect of the present invention, there is provided a non-transitory computer-readable storage medium which stores a program for causing a computer to execute an image processing method comprising: obtaining two shot images shot at two respective shooting positions an image sensor shifted in a first direction by a non-integer multiple of a pixel pitch of the image sensor; generating two enlarged images by enlarging the two shot images such that a pixel shift amount between the two enlarged images, which is derived from a shift between the two shooting positions, becomes an integer number of pixels; and obtaining a difference between the two enlarged images that have been aligned on a basis of the pixel shift amount between the two enlarged images.

Further features of the present invention will become apparent from the following description of exemplary embodiments with reference to the attached drawings.

DESCRIPTION OF THE EMBODIMENTS

Figure 1:
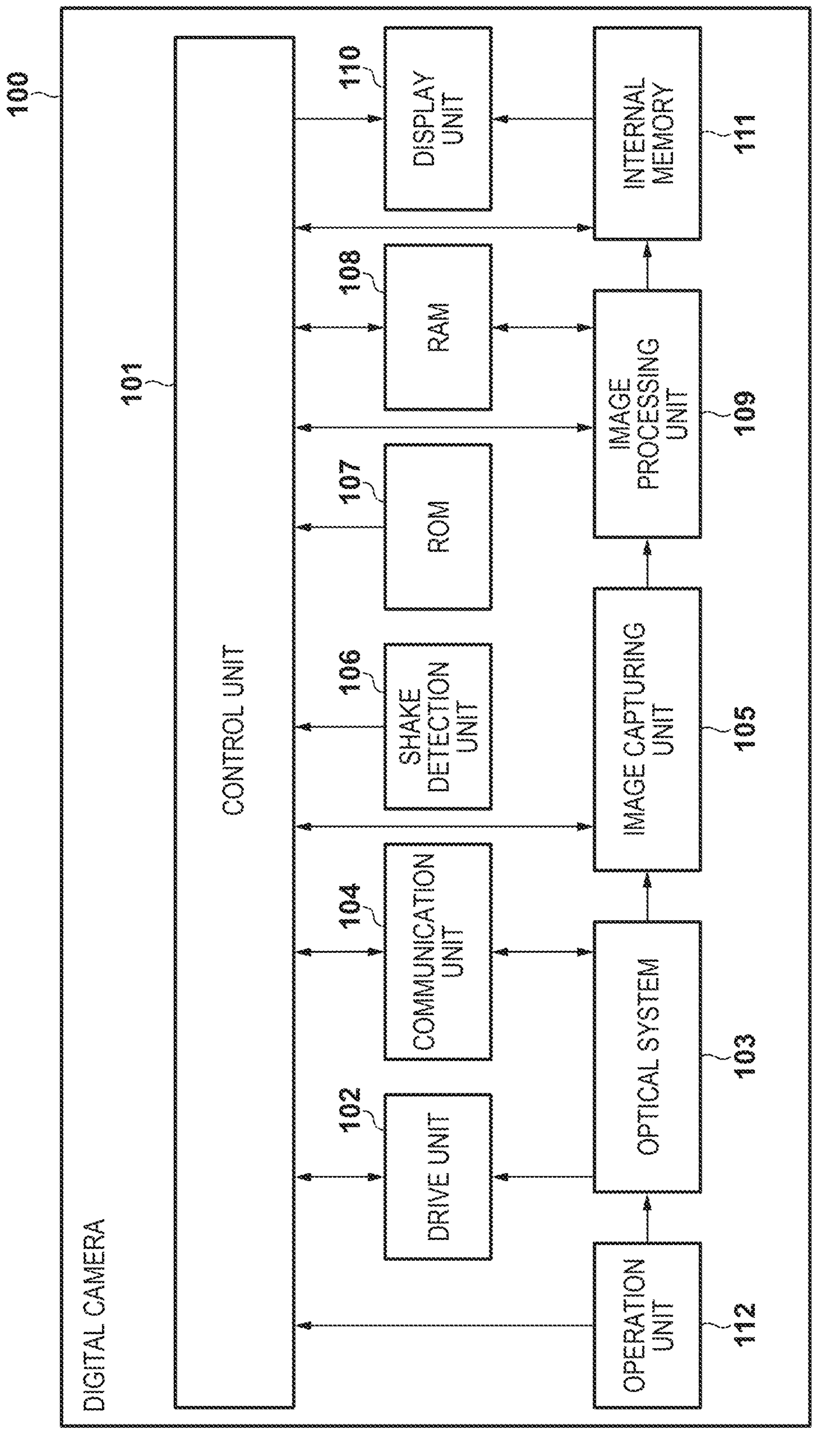
FIG. 1 is a block diagram illustrating the configuration of a digital camera 100 (an image capturing apparatus) including an image processing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating the configuration of a digital camera 100 (an image capturing apparatus) including an image processing apparatus. The digital camera 100 is capable of shooting still images. The digital camera 100 is also capable of moving the position of an image sensor included in an image capturing unit 105 in units smaller than a pixel pitch. Furthermore, the digital camera 100 is capable of performing image processing such as enlargement processing, pixel shift processing, composition processing, and the like on images which have been shot and stored or images which have been input from the exterior.

Although a digital camera will be used as an example in each embodiment, including the present embodiment, the embodiments are not limited to a digital camera. For example, a mobile device having a built-in image sensor, a network camera capable of capturing images, or the like may be used instead of the digital camera.

A control unit 101 includes a processor such as a CPU, an MPU, or the like, for example, and controls the blocks of the digital camera 100 by reading out and executing programs stored in a ROM 107 in advance. For example, the control unit 101 issues commands to the image capturing unit 105 to start and stop capturing images, as will be described later. The control unit 101 also issues commands for image processing to an image processing unit 109, on the basis of a program stored in the ROM 107. Commands from the user are input to the digital camera 100 through an operation unit 112, and are provided to each block of the digital camera 100 through the control unit 101.

A drive unit 102 includes a motor and the like, and mechanically operates an optical system 103 in response to commands from the control unit 101. For example, the drive unit 102 adjusts a focal length of the optical system 103 by moving the position of a focus lens included in the optical system 103 on the basis of commands from the control unit 101.

The optical system 103 includes a zoom lens, the focus lens, an aperture stop, and the like. The aperture stop is a mechanism that adjusts the amount of light passing therethrough. An in-focus position can be changed by changing the position of the lenses.

A communication unit 104 mainly transmits information between the control unit 101 and the optical system 103 in response to commands from the control unit 101.

The image capturing unit 105 includes an image sensor having photoelectric conversion elements, and performs photoelectric conversion for converting incident light into electrical signals. For example, a CCD sensor, a CMOS sensor, or the like can be used as the image sensor of the image capturing unit 105. The image sensor included in the image capturing unit 105 is configured to be capable of moving in a plane orthogonal to an optical axis of the optical system 103, by predetermined amounts in a horizontal direction, a vertical direction, and clockwise and counter-clockwise directions about the optical axis. The control unit 101 can control the position of the image sensor by controlling drive members such as a motor and the like in the drive unit 102. The position of the image sensor is controlled so as to implement an optical image stabilization function, a high-resolution image generation function, and the like.

A shake detection unit 106 detects shaking (vibrations) acting on the digital camera 100. Generally, a gyro sensor that detects the angular velocity of shaking is used as a sensor for detecting shaking.

The ROM 107 is a read-only non-volatile memory serving as a recording medium, and stores parameters and the like necessary for the operations by the blocks of the digital camera 100, in addition to operation programs for those blocks. A RAM 108 is a rewritable volatile memory, and is used as a temporary storage region for data output during the operations of the blocks of the digital camera 100.

The image processing unit 109 performs various types of image processing on images output from the image capturing unit 105 or images recorded in an internal memory 111, such as white balance adjustment, color interpolation, filtering, and the like. The image processing unit 109 also performs compression processing according to a standard such as JPEG or the like on images captured by the image capturing unit 105.

The image processing unit 109 is constituted by an integrated circuit (ASIC) that is a collection circuitry for performing specific processing. Alternatively, the control unit 101 may be configured to handle some or all of the functions of the image processing unit 109 by executing processing according to programs read out from the ROM 107. If the control unit 101 handles all the functions of the image processing unit 109, the digital camera 100 need not include the image processing unit 109 as hardware separate from the control unit 101.

A display unit 110 is a liquid crystal display or an organic EL display, and displays images temporarily stored in the RAM 108, images stored in the internal memory 111, settings screens for the digital camera 100, and the like.

The internal memory 111 is a memory for recording images captured by the image capturing unit 105, images processed by the image processing unit 109, information on the in-focus position when capturing an image, and the like. A memory card or the like may be used instead of the internal memory.

The operation unit 112 includes, for example, buttons, switches, keys, a mode dial, and the like provided in the digital camera 100. The operation unit 112 may also include a touch panel provided on the display unit 110. Commands from the user are provided to the control unit 101 through the operation unit 112.

High-resolution image generation processing including moving object region detection according to the first embodiment will be described next with reference to FIG. 2. The high-resolution image generation processing is performed by the image processing unit 109. Note that the high-resolution image generation processing is performed when a shooting mode for generating a high-resolution image (a super-resolution mode) is set, for example. When the super-resolution mode is set, the control unit 101 shoots a plurality of frames of low-resolution images to be used for increasing the resolution. Here, "low-resolution" image means an image having a resolution relatively lower than that of a composite image which will ultimately be generated (that is, the high-resolution image). Accordingly, the low-resolution image may be a still image at the highest resolution the image capturing unit 105 is capable of capturing. The image processing unit 109 generates a high-resolution image for a single frame using a plurality of frames of low-resolution images that have been shot.

Figure 2:
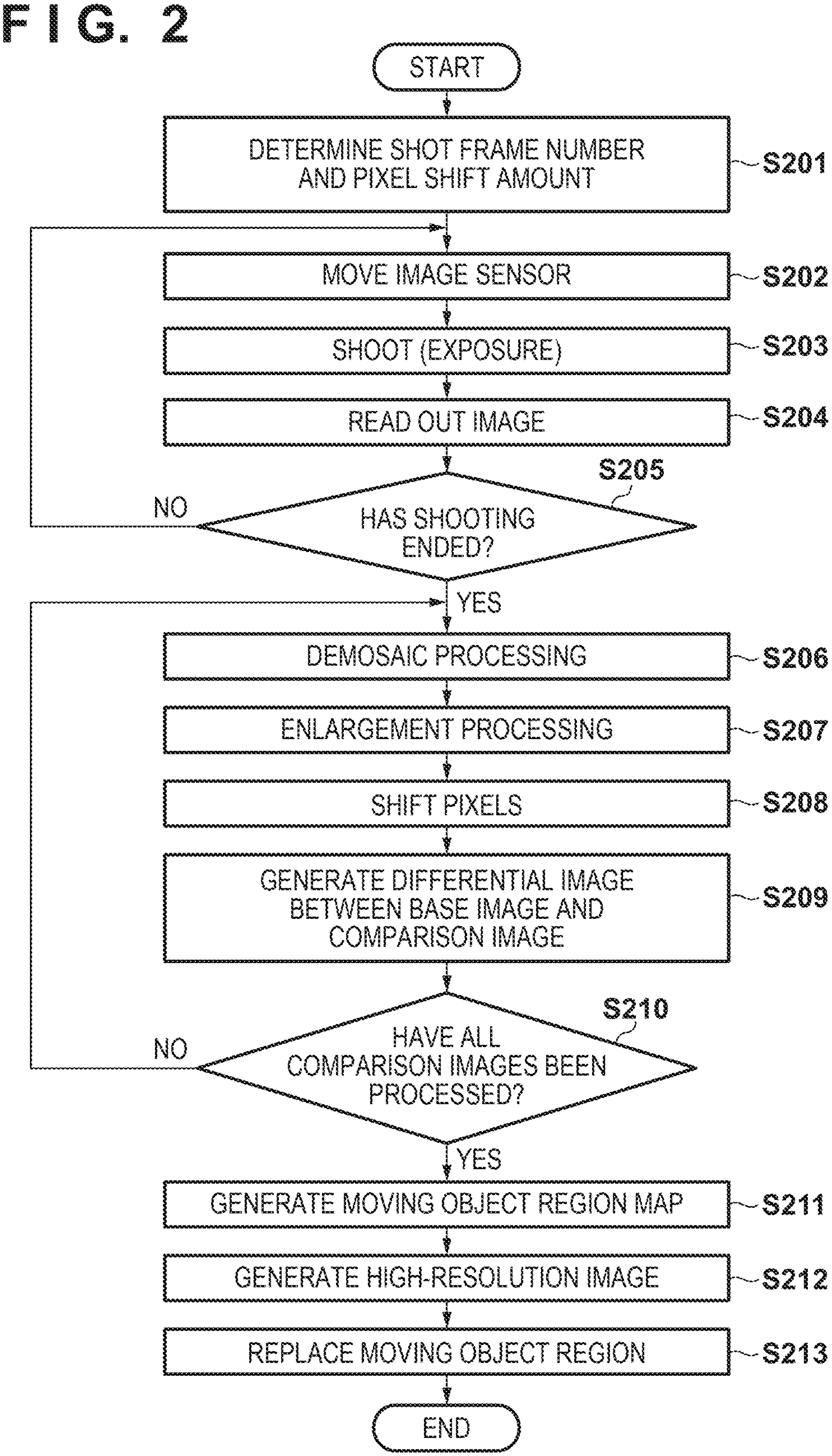
FIG. 2 is a flowchart illustrating high-resolution image generation processing including moving object region detection, according to a first embodiment.

In the example illustrated in FIG. 2, the image processing unit 109 generates the high-resolution image following the shooting of the plurality of frames of low-resolution images. However, the image processing unit 109 may temporarily stop the processing after recording the plurality of frames of low-resolution images in the internal memory 111, and then generate the high-resolution image on the basis of the recorded plurality of frames of low-resolution images at a desired timing thereafter.

FIG. 2 is a flowchart illustrating the high-resolution image generation processing including moving object region detection, according to the first embodiment. Unless otherwise noted, the processing of each step in this flowchart is performed under the overall control of the control unit 101, performed according to a program. The processing of this flowchart starts when a still image shooting start instruction is detected while the super-resolution mode is set. The still image shooting start instruction may be detected in response to a release switch included in the operation unit 112 being detected as fully-depressed, or may be detected in response to a standby time of a self-timer running out. Note that it is assumed that the control unit 101 has executed processing for determining shooting conditions (aperture value, shutter speed, shooting sensitivity) (that is, AE processing) and automatic focus detection processing (AF processing) for the optical system 103 at the point in time when a shooting preparation instruction is detected before the shooting start instruction has been detected. Note also that the shooting conditions may be values set by the user. The focal distance of the optical system 103 may also be set by the user manually.

In step S201, the control unit 101 determines a shot frame number and a pixel shift amount for the low-resolution images to serve as the source of the high-resolution image. As described above, "low-resolution" image means an image having a resolution relatively lower than that of a composite image which will ultimately be generated (that is, the high-resolution image). Accordingly, the low-resolution image may be a still image at the highest resolution the image capturing unit 105 is capable of capturing.

The shot frame number may be a fixed value set in advance, or may be selectable by the user from a plurality of options. The following descriptions will be given assuming the shot frame number is 4. However, the shot frame number is not limited to 4, and may be any value that is at least 2. Although a higher shot frame number makes it possible to achieve a higher resolution in the high-resolution image, even if the shot frame number is only 2, for example, the high-resolution image can still be generated from the two low-resolution images.

The pixel shift amount for varying the shooting position (viewpoint) can be determined through a variety of methods. For example, the pixel shift amount may be a fixed value, or may be a value based on the shot frame number. It is assumed here that the pixel shift amount is a value lower than the pixel pitch, and the following descriptions will assume that the pixel shift amount is ½ of a pixel (half the pixel pitch). However, the pixel shift amount is not limited to a value lower than the pixel pitch, and any desired value may be used as the pixel shift amount as long as the value is a non-integer multiple of the pixel pitch. The "pixel pitch" is the distance between the centers of adjacent pixels. Although the following descriptions will assume that the pixel pitch is the same in both the horizontal and vertical directions, the pixel pitch may be different in the horizontal and vertical directions. Additionally, the following descriptions will assume that the pixel shift amount in the horizontal and vertical directions is "pixel pitch/2". However, the pixel shift amount may differ in the horizontal and vertical directions.

The method through which at least one of the shot frame number and the pixel shift amount is determined can change according to the method by which the plurality of frames of low-resolution images are composited to generate one frame of the high-resolution image.

It is assumed here that the digital camera 100 is fixed on a tripod or the like, and that the control unit 101 varies the shooting positions of the low-resolution images by moving the image capturing unit 105 (and more specifically, the image sensor included in the image capturing unit 105). Additionally, although it is assumed here that the control unit 101 shoots the plurality of frames of low-resolution images using a still image continuous shooting function, a moving image having a plurality of frames may be shot and each of the frames in the moving image may be used as a single low-resolution image. When shooting a moving image, the framerate can be determined taking into account the time required to move the image capturing unit 105.

Figure 3:
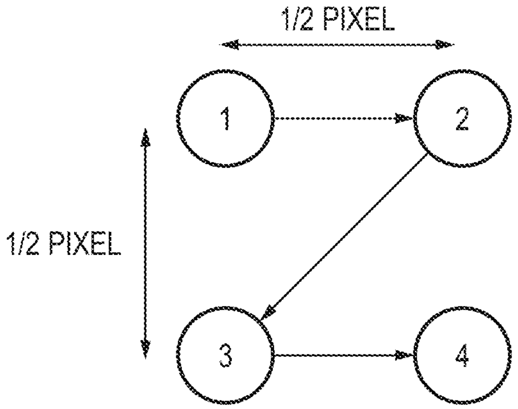
FIG. 3 is a conceptual diagram illustrating image sensor movement.

Steps S202 to S205 are processing for shooting the number of frames of low-resolution images determined in step S201. In step S202, the control unit 101 controls the drive unit 102 and moves the image capturing unit 105 (the image sensor) to achieve a pixel shift amount according to the frame. The movement direction of the image capturing unit 105 in each frame is assumed to be predetermined according to the shot frame number. Note that when shooting a base frame (e.g., the first frame), the control unit 101 performs the shooting without moving the image capturing unit 105 from a base position. For example, when shooting a total of four frames, the control unit 101 moves the image capturing unit 105 as illustrated in FIG. 3 when shooting each frame. FIG. 3 illustrates the position of the image capturing unit 105 (the image sensor) as seen from a rear surface side of the digital camera 100 (the opposite side of the digital camera 100 relative to the subject). As can be seen from FIG. 3, the movement amounts of the image capturing unit 105 in the frames, relative to the base position, are as follows.

First frame: no movement (base position)

Second frame: ½ pixel (half the pixel pitch) to the right from the base position Third frame: ½ pixel downward from the base position Fourth frame: ½ pixel to the right and ½ pixel downward from the base position Moving the image capturing unit 105 to a different position for each frame in this manner makes it possible to obtain four frames of low-resolution images from different shooting positions. Once the movement of the image capturing unit 105 is complete, the sequence moves to step S203.

In step S203, the control unit 101 controls the optical system 103 and the image capturing unit 105 to shoot one frame of a still image (expose the image sensor).

In step S204, the control unit 101 reads out an analog image signal from the image capturing unit 105. The read-out analog image signal is input into the image processing unit 109. The image processing unit 109 performs A/D conversion on the analog image signal, and stores the result in the RAM 108 as a low-resolution image. At this point in time, the image processing unit 109 does not perform processing for increasing the resolution.

In step S205, the control unit 101 determines whether shooting for the number of frames determined in step S201 has ended. If the shooting has ended, the sequence moves to step S206. If the shooting has not ended, the sequence returns to step S202, and the processing of steps S202 to S204 is performed again to shoot the next frame.

Steps S206 to S210 are processing for obtaining a difference by aligning the low-resolution images. In the present embodiment, one of the plurality of low-resolution images stored in the RAM 108 is used as the base image, the remaining low-resolution images are used as comparison images, and a difference between the base image and each comparison image are obtained. By repeating the loop of steps S206 to S210 the same number of times as there are comparison images, the image processing unit 109 performs the alignment with the base image, and obtains the difference, for each comparison image.

Figure 4:
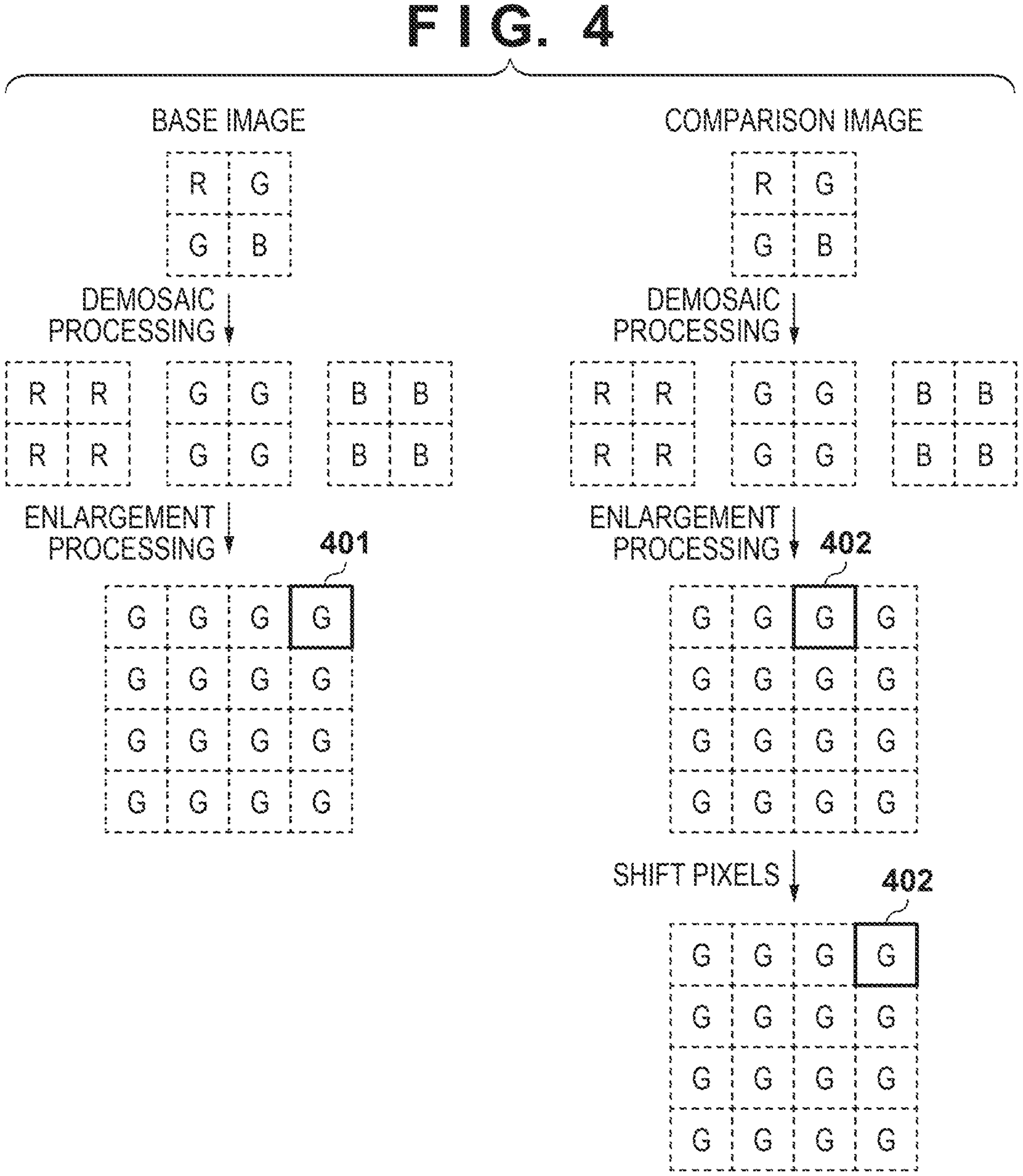
FIG. 4 is a schematic diagram illustrating the alignment of a base image and a comparison image through processing of steps S206 to S208.

FIG. 4 is a schematic diagram illustrating the alignment of the base image and the comparison image through the processing of steps S206 to S208. In the example in FIG. 4, the base image is the low-resolution image in the first frame, and the comparison image is the low-resolution image in the second frame. As illustrated in FIG. 4, the image processing unit 109 performs demosaic processing and enlargement processing (steps S206 and S207) on the base image. The image processing unit 109 also performs demosaic processing, enlargement processing, and pixel shifting (steps S206 to S208) on the comparison image. Although only one comparison image is illustrated in FIG. 4, the same processing is performed for the other comparison images (note, however, the direction of the pixel shift is changed as appropriate according to the relationship between the position of the image capturing unit 105 when shooting the comparison image and the position of the image capturing unit 105 when shooting the base image).

Referring again to FIG. 2, in step S206, the image processing unit 109 performs demosaic processing on the base image and one of the plurality of comparison images. If the image sensor of the image capturing unit 105 has a primary color Bayer array color filter, the image processing unit 109 generates an image in which each pixel has RGB components (an RGB image), as illustrated in FIG. 4. Note that the demosaic processing need not be performed in the case of a single-color image sensor, where the image sensor of the image capturing unit 105 is not provided with a color filter.

In step S207, the image processing unit 109 performs the enlargement processing on each color component of the RGB image generated in step S206. The enlargement rate is set such that the RGB image is at the same resolution as the high-resolution image (such that the resolution of the enlarged base image and the comparison image is equal to the resolution of the high-resolution image). For example, if four frames of low-resolution images are shot having shifted the pixels (having moved the image capturing unit 105) by half a pixel as illustrated in FIG. 3, an enlargement rate of 2× is set in both the vertical and horizontal directions of the RGB image, as illustrated in FIG. 4.

Note that the enlargement rate used here is not limited to a value that puts the RGB image at the same resolution as the high-resolution image. Although there is a pixel shift amount derived from the shift between the shooting positions between the enlarged base image and the enlarged comparison image, the image processing unit 109 may enlarge the base image and the comparison image such that the pixel shift amount is an integer number of pixels. Performing such enlargement processing makes it possible to accurately align the enlarged base image and the enlarged comparison image in step S208, which will be described next.

In step S208, the image processing unit 109 shifts the positions of the pixels in the comparison image enlarged in step S207 such that the spatial phases (viewpoints) of the base image and the comparison image enlarged in step S207 match. For example, if four frames of low-resolution images are shot having shifted the pixels by half a pixel as illustrated in FIG. 3, the enlarged comparison image is shifted by one pixel relative to the enlarged base image in at least one of the vertical and horizontal directions. In the example illustrated in FIG. 4, the enlarged comparison image is shifted by one pixel to the left relative to the enlarged base image, as can be seen from the positional relationship between a pixel 401 and a pixel 402 corresponding to the pixel 401. Accordingly, the image processing unit 109 aligns the spatial phase (viewpoint) of the enlarged comparison image with the enlarged base image by shifting the enlarged comparison image to the right by one pixel.

In step S209, the image processing unit 109 generates a differential image by calculating (obtaining), on a pixel-by-pixel basis, the difference between the base image for which the processing of steps S206 to S207 has been performed and the comparison image for which the processing of steps S206 to S208 has been performed.

In step S210, the control unit 101 determines whether all the comparison images have been processed. If all the comparison images have been processed, the sequence moves to step S211. If not, the sequence returns to step S206, and the processing of steps S206 to S209 is performed on the next comparison image. Note that the processing for the base image can be omitted in the second and subsequent instances of steps S206 and S207. In this case, the image processing unit 109 reuses the base image subjected to the demosaic processing and the enlargement processing in the first instance of steps S206 and S207.

In step S211, the image processing unit 109 generates a moving object region map by detecting a changed region (a region having a large difference, i.e., a region in which there is a large change in the image) on the basis of the plurality of differential images generated in step S209. For example, the image processing unit 109 generates a changed region map for the R component on the basis of the absolute value of the pixel value of each pixel for the R component in a single differential image. For example, the image processing unit 109 sets "1" in the R component changed region map for pixels corresponding to an absolute value that is at least a threshold, and sets "0" in the R component changed region map for pixels corresponding to an absolute value below the threshold. In this case, the region where "1" is set in the R component changed region map corresponds to the changed region for the R component. The image processing unit 109 generates changed region maps for the G component and the B component in the same manner. In the same manner, the image processing unit 109 generates a changed region map for each color component for each of the remaining differential images. The image processing unit 109 then generates the moving object region map by adding the changed region maps for the color components in each differential image. In this case, the region in the moving object region map in which a value of at least "1" is set corresponds to the moving object region (a region where the object has moved between the base image and at least one of the comparison images).

Although the foregoing has described obtaining the difference between the base image and the comparison image on a pixel-by-pixel basis, a configuration may be adopted in which both the base image and the comparison image are divided into blocks, and a difference is obtained on a block-by-block basis. Additionally, although the foregoing has described obtaining a difference for each of the R, G, and B color components, a configuration may be adopted in which the difference is obtained using a luminance component instead of color components.

In step S212, the image processing unit 109 composites the plurality of low-resolution images stored in the RAM 108 to generate the high-resolution image, by performing processing which uses pixel insertion to increase the resolution, as disclosed in, for example, Japanese Patent Laid-Open No. 2012-226489. Note, however, that the method for generating the high-resolution image is not limited to the method disclosed in Japanese Patent Laid-Open No. 2012-226489, and another publicly-known method may be used instead.

In step S213, the image processing unit 109 identifies the moving object region in the high-resolution image on the basis of the moving object region map generated in step S211. Then, by replacing the moving object region with another image, the image processing unit 109 generates an image in which the moving object region is depicted naturally. For example, the image processing unit 109 crops out a region corresponding to the moving object region from the high-resolution image using the moving object region map as a mask. The image processing unit 109 then replaces the region cropped out from the high-resolution image with the corresponding region from one of the plurality of low-resolution images.

As described above, according to the first embodiment, the digital camera 100 obtains two shot images (two low-resolution images) shot at two respective shooting positions of the image sensor shifted in a first direction (e.g., the horizontal direction) by a non-integer multiple of the pixel pitch of the image sensor (half the pixel pitch, in the foregoing example) (steps S201 to S205). Then, the digital camera 100 generates two enlarged images (the enlarged base image and comparison image) by enlarging the two shot images such that a pixel shift amount between the two enlarged images, which is derived from a shift between the two shooting positions, becomes an integer number of pixels (step S207). Finally, the digital camera 100 obtains a difference between the two enlarged images that have been aligned on the basis of the pixel shift amount between the two enlarged images (steps S208 to S209).

In this manner, according to the present embodiment, the two shot images are enlarged such that the pixel shift amount between the two enlarged images is an integer number of pixels. This makes it possible to accurately align the two enlarged images and obtain the difference between the two enlarged images with a high level of accuracy. The difference obtained in this manner represents the difference between the two shot images corresponding to the two enlarged images. Therefore, according to the present embodiment, it is possible to obtain information accurately expressing the difference between images shot at shooting positions shifted by a non-integer multiple of the pixel pitch of the image sensor.

Second Embodiment

The first embodiment described a configuration in which the moving object region is replaced after generating the high-resolution image using the plurality of low-resolution images that have been shot. However, a second embodiment will describe a configuration in which at least two low-resolution images to be used to generate the high-resolution image are selected from the plurality of low-resolution images that have been shot, and the high-resolution image is then generated using the at least two low-resolution images that have been selected. In the present embodiment, the basic configuration of the digital camera 100 is the same as in the first embodiment. The following will primarily describe configurations that are different from the first embodiment.

Figure 5:
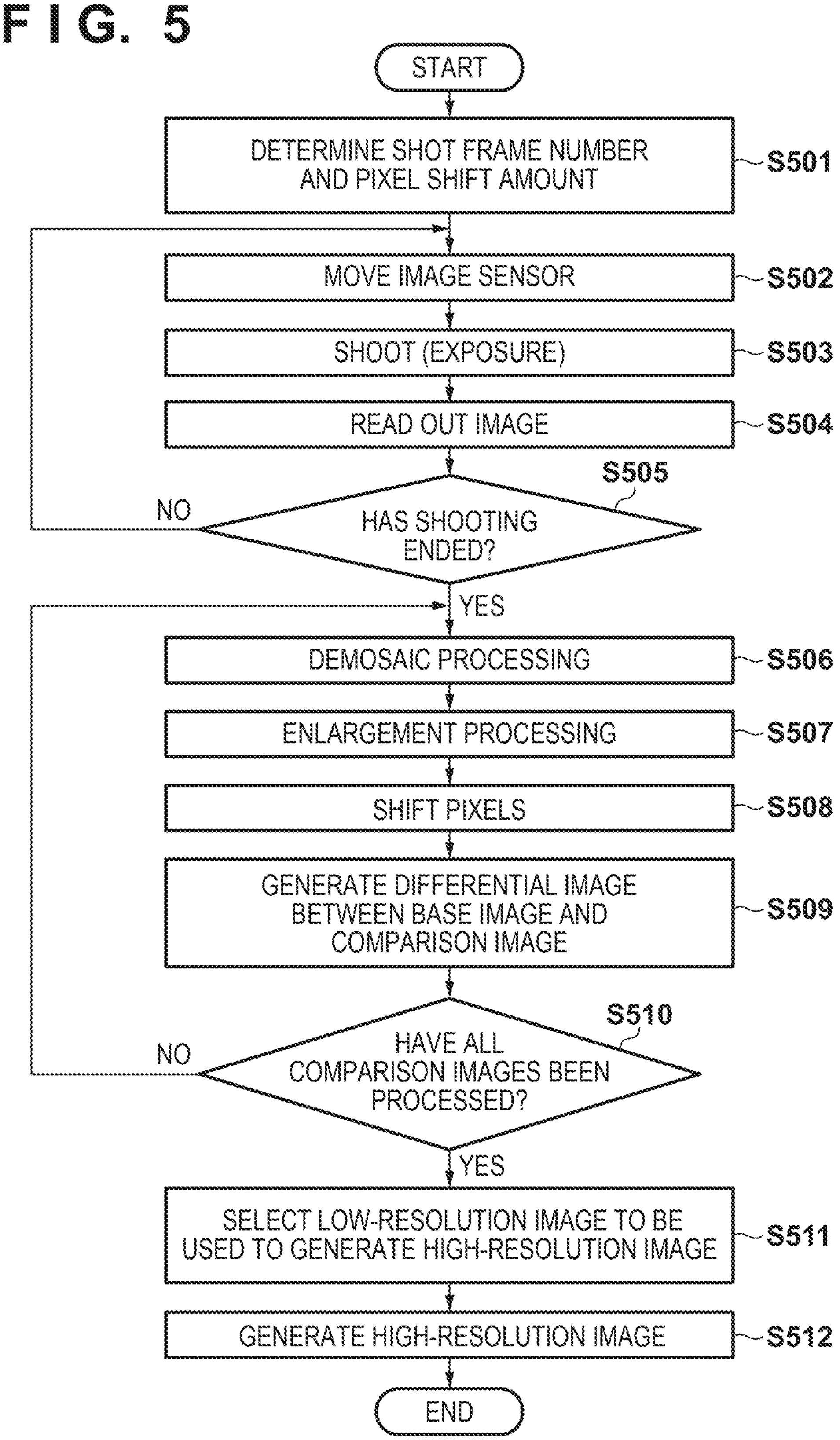
FIG. 5 is a flowchart illustrating high-resolution image generation processing including moving object region detection, according to a second embodiment.

FIG. 5 is a flowchart illustrating the high-resolution image generation processing including moving object region detection, according to the second embodiment. Unless otherwise noted, the processing of each step in this flowchart is performed under the overall control of the control unit 101, performed according to a program.

The processing of steps S501 to S510 is similar to the processing of steps S201 to S210 in FIG. 2, described in the first embodiment. However, although the shot frame number was at least 2 in the first embodiment, the shot frame number is at least 3 in the second embodiment.

In step S511, the image processing unit 109 selects the low-resolution images to be used to generate the high-resolution image, on the basis of the plurality of differential images generated in step S509. Here, the selection is performed for each differential image. Specifically, the image processing unit 109 takes a single differential image as a target differential image, and generates a changed region map for each color component in the target differential image, using the same method as that of step S211 in FIG. 2. The image processing unit 109 then generates a differential region map by adding the changed region maps for the color components. A region in the differential region map where a value of at least "1" is set corresponds to a differential region (a region where an object has moved between the base image and a comparison image corresponding to the target differential image). The image processing unit 109 determines whether the size of the differential region is lower than a threshold. If the size of the differential region is lower than the threshold, the image processing unit 109 selects the low-resolution image corresponding to the comparison image that corresponds to the target differential image as one of the low-resolution images to be used to generate the high-resolution image. Similarly, for each of the remaining differential images, the image processing unit 109 generates a differential region map and, when the size of the differential region is lower than the threshold, selects the corresponding low-resolution image as one of the low-resolution images to be used to generate the high-resolution image. Note that the low-resolution image corresponding to the base image is selected as one of the low-resolution images to be used to generate the high-resolution image, regardless of the content of each differential image.

In step S512, the image processing unit 109 generates the high-resolution image by compositing the at least two low-resolution images selected in step S511.

As described above, according to the second embodiment, the digital camera 100 obtains at least three shot images shot at least three shooting positions (steps S501 to S505). A specific shooting position among the at least three shooting positions is shifted, relative to at least two shooting positions aside from the specific shooting position, by a non-integer multiple of the pixel pitch in at least one of a first direction (e.g., the horizontal direction) and a second direction orthogonal to the first direction (e.g., the vertical direction). The digital camera 100 generates at least three enlarged images (the enlarged base image and at least two enlarged comparison images) by enlarging the at least three shot images such that a pixel shift amount between the at least three enlarged images, which is derived from a shift between the at least three shooting positions, becomes an integer number of pixels (step S507). For each of the at least two comparison images, the digital camera 100 obtains a difference between the comparison image and the base image that have been aligned on the basis of the pixel shift amount between the comparison image and the base image (steps S508 to S509). Then, for each of the at least two comparison images, when the difference is lower than a predetermined criterion (when the size of the differential region is lower than the threshold, in the foregoing example), the digital camera 100 selects the shot image (the low-resolution image) corresponding to the comparison image as the shot image for compositing. Finally, the digital camera 100 generates a high-resolution image by compositing (i) the shot image (low-resolution image) that, among the at least three shot images, corresponds to the base image with (ii) at least one shot image (low-resolution image) selected as the shot image for compositing.

In this manner, according to the second embodiment, there are situations where the number of low-resolution images used to generate the high-resolution image decreases due to some low-resolution images not being selected in step S511. In such a case, the resolution of the high-resolution image drops. However, according to the second embodiment, the moving object region is not replaced, and thus unlike the first embodiment, the resolution of the moving object region can be made the same as the resolution of the non-moving object region.

Note that in step S511, if the difference is not lower than the predetermined criterion for all of the at least two comparison images, the digital camera 100 may select, as the shot image for compositing, the shot image corresponding to the comparison image that, of the at least two comparison images, corresponds to the lowest difference. This makes it possible to generate a high-resolution image even if the difference is not lower than the predetermined criterion on for all of the at least two comparison images.

Third Embodiment

A third embodiment will describe a configuration in which when the difference between the base image and the comparison image is greater than a predetermined criterion, the shot image is re-generated by re-shooting at the same shooting position.

Figure 6:
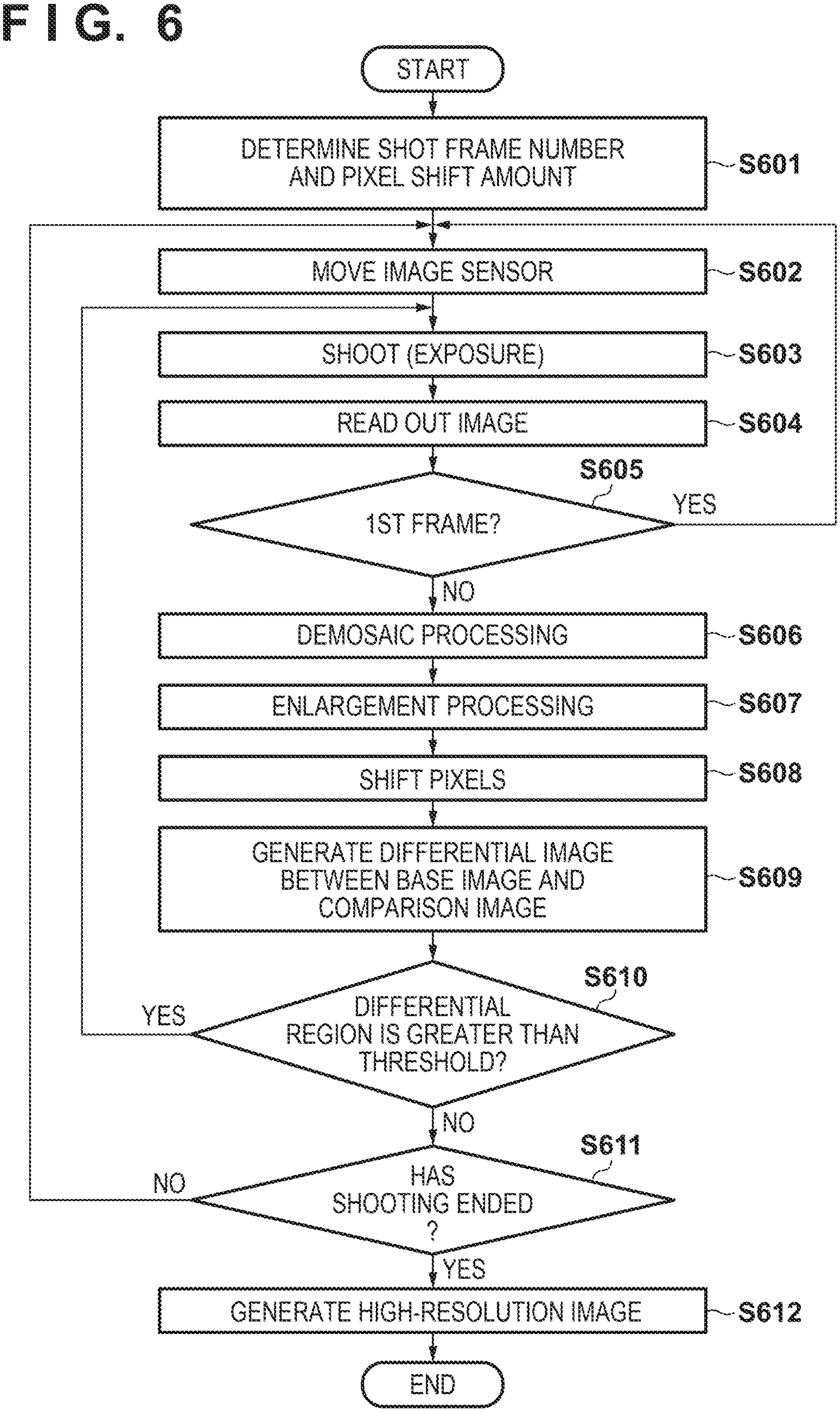
FIG. 6 is a flowchart illustrating high-resolution image generation processing including moving object region detection, according to a third embodiment.

FIG. 6 is a flowchart illustrating the high-resolution image generation processing including moving object region detection, according to the third embodiment. Unless otherwise noted, the processing of each step in this flowchart is performed under the overall control of the control unit 101, performed according to a program.

The processing of steps S601 to S604 is similar to the processing of steps S201 to S204 in FIG. 2, described in the first embodiment.

In step S605, the control unit 101 determines whether the current instance of shooting is the shooting for the first frame. If the current instance of shooting is the shooting for the first frame, the sequence returns to step S602, and the processing of steps S602 to S604 is performed to shoot the next frame. However, if the current instance of shooting is not the shooting for the first frame, the sequence moves to step S606.

The processing of steps S606 to S609 is similar to the processing of steps S206 to S209 in FIG. 2, described in the first embodiment. However, and the third embodiment, the comparison image is the image shot most recently, and the base image is any one image shot previously. For example, the first time the processing of steps S606 to S609 is performed, the comparison image is the low-resolution image from the second frame, and the base image is the low-resolution image from the first frame.

In step S610, the control unit 101 generates the differential region map on the basis of the differential image and determines whether the size of the differential region is greater than a threshold, through the same method as that of step S511 in FIG. 5. If the size of the differential region is not greater than the threshold, the sequence moves to S611. However, if the size of the differential region is greater than the threshold, the control unit 101 discards the shot image corresponding to the comparison image. Then, by returning the sequence to step S603, the control unit 101 controls the shooting to be performed again at the same shooting position as that of the shot image that has been discarded, so as to re-generate the shot image corresponding to that shooting position.

In step S611, the control unit 101 determines whether shooting for the number of frames determined in step S601 has ended. If the shooting has ended, the sequence moves to step S612. If the shooting has not ended, the sequence returns to step S602, and the processing of steps S602 to S610 is performed again to shoot the next frame.

In step S612, the control unit 101 generates a high-resolution image through the same processing as that of step S212 in FIG. 2.

As described above, according to the third embodiment, when the difference between the base image and the comparison image is greater than a predetermined criterion (when the size of the differential region is greater than the threshold, in the foregoing example), the digital camera 100 re-generates the shot image by performing shooting again at the same shooting position. Here, unlike the first embodiment, processing for replacing the moving object region in the high-resolution image with a region corresponding to one of the plurality of low-resolution images is not performed in the third embodiment. The present embodiment therefore makes it possible to suppress a drop in the resolution resulting from replacing the moving object region.

Although the foregoing three embodiments described different examples of methods for compensating for the image of a moving object region in the high-resolution image, other methods may be adopted as well. For example, a method that interpolates the image of the moving object region from the images of regions around the moving object region in the high-resolution image may be used instead of the method that replaces the image with an image of the corresponding region in the low-resolution image described in the first embodiment.

Additionally, the result of detecting the moving object region may be used in processing aside from compensating for the image of the moving object region. For example, the result may be used in processing for notifying the user that a moving object region is present, processing for displaying an indication of the position of the moving object region, rating processing for determining an evaluation value according to whether or not a moving object region is present, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-008220, filed Jan. 23, 2024, which is hereby incorporated by reference herein in its entirety.

What is claimed is:

1. An image processing apparatus comprising at least one processor and/or at least one circuit which functions as:

a first obtaining unit configured to obtain two shot images shot at two respective shooting positions of an image sensor shifted in a first direction relative to each other by a non-integer multiple of a pixel pitch of the image sensor;

a first generating unit configured to generate two enlarged images by enlarging the two shot images such that a pixel shift amount between the two enlarged images, which is derived from a shift between the two shooting positions, becomes an integer number of pixels; and a second obtaining unit configured to obtain a difference between the two enlarged images that have been aligned on a basis of the pixel shift amount between the two enlarged images.

2. The image processing apparatus according to claim 1, wherein the at least one processor and/or the at least one circuit further functions as:

a second generating unit configured to generate a high-resolution image, having a resolution higher than the two shot images, by compositing the two shot images;

an identifying unit configured to identify a moving object region in the high-resolution image on a basis of the difference; and a replacing unit configured to replace the moving object region of the high-resolution image with a corresponding region of either one of the two shot images.

3. The image processing apparatus according to claim 2, wherein a resolution of the two enlarged images is equal to the resolution of the high-resolution image.

4. The image processing apparatus according to claim 1, wherein the shift between the two shooting positions is smaller than the pixel pitch.

5. The image processing apparatus according to claim 1, wherein the first obtaining unit obtains at least three shot images shot at at least three respective shooting positions of the image sensor, a specific shooting position among the at least three shooting positions is shifted from at least two shooting positions aside from the specific shooting position by a non-integer multiple of the pixel pitch in at least one of the first direction and a second direction orthogonal to the first direction, the first generating unit generates at least three enlarged images by enlarging the at least three shot images such that a pixel shift amount among the at least three enlarged images, which is derived from a shift among the at least three shooting positions, becomes an integer that is a unit of a number of pixels, taking one of the at least three enlarged images as a base image and remaining at least two enlarged images as at least two comparison images, the second obtaining unit obtains, for each of the at least two comparison images, a difference between the comparison image and the base image that have been aligned on a basis of a pixel shift amount between the comparison image and the base image, and the at least one processor and/or the at least one circuit further functions as:

a selecting unit configured to, for each of the at least two comparison images, select a shot image corresponding to the comparison image as a shot image for compositing, when the difference is lower than a predetermined criterion; and a second generating unit configured to generate a high-resolution image having a higher resolution than the at least three shot images by compositing (i) a shot image, among the at least three shot images, that corresponds to the base image with (ii) at least one shot image selected as the shot image for compositing.

6. The image processing apparatus according to claim 5, wherein when the difference is not lower than the predetermined criterion for all of the at least two comparison images, the selecting unit selects, as the shot image for compositing, a shot image corresponding to a comparison image, among the at least two comparison images, that corresponds to a lowest difference.

7. An image capturing apparatus comprising:

an image sensor; and at least one processor and/or at least one circuit which functions as:

a first obtaining unit configured to obtain two shot images shot at two respective shooting positions of the image sensor shifted in a first direction relative to each other by a non-integer multiple of a pixel pitch of the image sensor;

a first generating unit configured to generate two enlarged images by enlarging the two shot images such that a pixel shift amount between the two enlarged images, which is derived from a shift between the two shooting positions, becomes an integer number of pixels; and a second obtaining unit configured to obtain a difference between the two enlarged images that have been aligned on a basis of the pixel shift amount between the two enlarged images.

8. The image capturing apparatus according to claim 7, wherein the at least one processor and/or the at least one circuit further functions as:

a control unit configured to control the two shot images to be generated by shooting at the two shooting positions using the image sensor, the control unit being configured to, when the difference between the two enlarged images generated from the two shot images is greater than a predetermined criterion, re-generate a shot image, among the two shot images, that corresponds to a first shooting position among the two shooting positions, by re-shooting at the first shooting position; and a second generating unit configured to generate a high-resolution image, having a resolution higher than the two shot images, by compositing the two shot images.

9. An image processing method executed by an image processing apparatus, comprising:

obtaining two shot images shot at two respective shooting positions of an image sensor shifted in a first direction relative to each other by a non-integer multiple of a pixel pitch of the image sensor;

generating two enlarged images by enlarging the two shot images such that a pixel shift amount between the two enlarged images, which is derived from a shift between the two shooting positions, becomes an integer number of pixels; and obtaining a difference between the two enlarged images that have been aligned on a basis of the pixel shift amount between the two enlarged images.

10. A non-transitory computer-readable storage medium which stores a program for causing a computer to execute an image processing method comprising:

obtaining two shot images shot at two respective shooting positions of an image sensor shifted in a first direction relative to each other by a non-integer multiple of a pixel pitch of the image sensor;

generating two enlarged images by enlarging the two shot images such that a pixel shift amount between the two enlarged images, which is derived from a shift between the two shooting positions, becomes an integer number of pixels; and obtaining a difference between the two enlarged images that have been aligned on a basis of the pixel shift amount between the two enlarged images.

* * * * *